United States Patent Office 3,507,656
Patented Apr. 21, 1970

3,507,656
RADIATION-SENSITIVE EMULSIONS
Joseph Anthony Sincius, Little Silver, N.J., assignor to E. I. du Pont de Nemours and Company, Wilmington, Del., a corporation of Delaware
No Drawing. Filed Jan. 10, 1966, Ser. No. 519,436
Int. Cl. G03c *1/28, 1/86*
U.S. Cl. 96—85                                                6 Claims

ABSTRACT OF THE DISCLOSURE

A light-developable, direct-writing silver halide layer containing silver halide grains 0.1–10 microns in size containing based on the silver halide 0.1–300 mole percent cuprous thiocyanate, 0.1 to 120 mole percent of a water-soluble thiocyanate salt, 0 to 120 mole percent of a water-soluble bromide, and 0 to 5 mole percent of a water-soluble plumbous salt. The layers are useful for oscillographic recording, provide images of high density, low fog or background density, high writing speeds, and rapid access.

---

This invention relates to improved direct-writing, radiation-sensitive emulsions which may be light-developed or chemically developed to form a visible image.

Radiation-sensitive elements adapted for light-recording, e.g., oscillographic recording, are known. However, these elements have slow speed, require long access time and have low image density. In addition, they lack image stability under ambient light conditions and are not developable by conventional chemical developer solutions.

The light-developable, direct-writing, light sensitive emulsions and emulsion layers of this invention comprise an emulsion or dispersion of radiation-sensitive silver halide grains having average grain size in the range 0.1–10 microns in a water-permeable organic macromolecular colloid having protective colloid properties, said emulsion containing, based on the silver halide:

(a) 0.1 to 300 mole percent of cuprous thiocyanate, preferably 0.5 to 40 mole percent
(b) 0.1 to 120 mole percent of a water-soluble thiocyanate salt, and optionally
(c) 0 to 120 mole percent of a water-soluble bromide, and
(d) 0 to 5 mole percent of a water-soluble plumbous salt.

The photographic silver halide emulsions preferably are the silver bromide or silver chlorobromide type, but other types, i.e., chloride, iodobromide, etc. can be used. Suitable emulsions are those described in Hunt U.S. Patents 3,033,678 and 3,033,682. The background density, image density, and image stability of such emulsion coatings depend on the silver halide combination employed and where necessary can be improved by the use of plumbous salts and soluble bromide e.g., lithium, sodium, potassium, calcium, magnesium, or ammonium bromide, as taught by Hunt U.S. Patent 3,033,682. A particularly suitable emulsion is that prepared by the method of Bigelow U.S. Patent 3,178,293 in which the aqueous silver nitrate used in precipitating the silver halide contains a water-soluble plumbous salt.

After precipitating and ripening, the emulsion may or may not be, but preferably is, washed. Washing may be done as described in Moede U.S. Patent 2,772,165. The emulsion is redispersed and digested in a conventional manner. At this point or prior to digestion, optical sensitizing dyes and chemical sensitizers, e.g., gold and sulfur sensitizers, may be added to increase the spectral response and overall sensitivity of the emulsion for use in instruments employing a variety of light sources. Chemical sensitizers are particularly efficacious in increasing the wet-developed speed. During or after this operation, cuprous thiocyanate and a water-soluble thiocyanate salt are added to the silver halide emulsion. Three alternate techniques which may be used are as follows:

(1) By adding a gelatino-cuprous thiocyanate dispersion and a soluble thiocyanate salt to the emulsion. The gelatin dispersion may be prepared as described in Example I of assignee's Sincius application U.S. Ser. No. 432,005 filed Feb. 11, 1965 abandoned after refiling on July 6, 1966, continuation-in-part application Ser. No. 565,035;

(2) By adding CuSCN dissolved as a complex salt in a concentrated aqueous solution of a soluble triocyanate;

(3) By an in situ reaction in the silver halide emulsion between thiocyanate, bisulfite and Cu (II) ions. After the digestion step, the usual coating adjuvants, e.g., hardeners, wetting agents, etc. are added and the viscosity is adjusted as desired by the addition of a further amount of gelatin or other colloid. In general, the ratio of gelatin to silver halide is 1:1; however, this is not at all critical. The prepared emulsion is then coated on a suitable support, e.g., paper, and dried to give a dry coating weight equivalent to about 30 mg. AgBr/dm.$^2$.

To determine the sensitometric characteristics of the material, it may be exposed through a 21-step $\sqrt{2}$ step wedge in an electronic flash sensitometer as described in U.S. Patent 3,033,678. This instrument uses a xenon discharge tube and provides exposure times of $10^{-2}$, $10^{-3}$, $10^{-4}$, $10^{-5}$, and $10^{-6}$ seconds. Relative sensitivities can be expressed as the number of steps recorded in the image. The exposed material may be light developed by irradiation with room lighting or with a fluorescent black light tube, e.g., at about 75 meter-candles intensity. The images become easily visible in from 0.1 to 15 seconds. To determine the densities of image and background, a reflection densitometer may be used whose values correspond to visual density. To test the stability of the background, the light-developed image record is exposed for 15 hours to room light at 50 meter-candles. Speed in oscillography is measured in inches per second an dis called writing speed. The usual radiation source is an oscillograph Osram high-pressure arc lamp as described in U.S. Patent 3,033,678. Writing speeds are determined from the frequency of the signal and the peak-to-peak amplitude of oscillation as recorded on the paper.

The invention will be further illustrated, but is not intended to be limited by, the following examples.

EXAMPLE I

The following solutions were prepared:

Solution A:                                                 Grams
    Distilled water _____ 820
    Ammonium thiocyanate _____ 64
    Sodium bisulfite _____ 90
Solution B:
    Distilled water _____ 800
    Cupric sulfate pentahydrate _____ 200

Solution B was slowly added to Solution A with constant stirring. A voluminous white precipitate of cuprous thiocyanate formed. An additional 10 grams of solid sodium bisulfite was then added and the mixture stirred for ½ hour. The mixture was centrifuged, the supernatant liquid decanted, and the precipitate washed with 100 grams of distilled water. The centrifuging and washing was repeated three times. The cuprous thiocyanate was then dried.

The following solutions were prepared:

Solution C:  Grams
  Distilled water _____ 200
  Potassium thiocyanate _____ 299
Solution D:
  Distilled water _____ 6000
  Gelatin _____ 10

Solution C was heated to 160° F. and 52 grams of solid cuprous thiocyanate were added in small increments and stirred until dissolved. This yellow solution was decolorized by adding one gram of copper dust and stirring. Solution D was stirred rapidly and Solution C containing the cuprous thiocyanate was added through filter paper to remove the copper dust. The cuprous thiocyanate precipitated, yielding a well dispersed gelatin-cuprous thiocyanate emulsion which was coagulation washed and redispersed according to the general technique for washing gelatino silver halide emulsions as taught by Moede U.S. Patent 2,772,165. The composition by weight of the finished emulsion was as follows:

Percent
Cuprous thiocyanate _____ 8
Gelatin _____ 4

A gelatino-silver chlorobromide emulsion was made by slowly adding an aqueous solution containing a mixture of 1 mole of silver nitrate and 0.033 mole of plumbous nitrate to a gelatin solution containing 1 mole of potassium chloride and acidified with 0.05 mole of hydrochloric acid. The precipitation was carried out under a red safelight. The temperature at precipitation and for 40 minutes thereafter was held at 140° F. After precipitation, an aqueous solution of 1.6 moles of potassium bromide was added while the mixture was held at 140° F. The resulting emulsion was coagulated, washed and redispersed in accordance with the technique described in Moede U.S. Patent 2,772,165. To the redispersed emulsion a sufficient amount of the above described cuprous thiocyanate emulsion was added to provide a silver bromide/cuprous thiocyanate molar ratio of 3/1. The resulting mixture was stirred vigorously for 5 minutes at 95° F. An aqueous solution of 3 M ammonium thiocyanate was then added to provide 20 mole percent of ammonium thiocyanate based on the silver bromide. The resulting emulsion, after the addition of the usual hardeners and coating aids, was coated on a paper support to give a dry coating weight equivalent to 35 mg. of silver bromide per square decimeter. The coated emulsion was dried in a conventional manner. A sample of the coated material when exposed in an oscillograph as described above gave a writing speed of 18,000 inches per second using a 3500 cycle/second signal and a one-inch amplitude. A sample strip of coated material was also exposed for 100 microseconds through a 21-step $\sqrt{2}$ wedge of a sensitometer (Edgerton, Germeshausen and Grier Mark VII Model). The sample strip was light-developed for 3-min. by irradiation from a fluorescent lamp at an intensity of 32 footcandles. An image became visible in 9 seconds. After 3 minutes, 17 steps of the wedge were visible. The image was deep blue against a light buff background.

A second so-exposed sensitometric strip was developed in a conventional methol-hydroquinone developer for 2 minutes and yielded, after fixing and washing, a 13-step image having a $D_{max}$ of 1.0 and 0.00 background density.

EXAMPLE II

An aqueous solution was prepared by dissolving 45.7 grams of ammonium thiocyanate and 6 grams of cuprous thiocyanate in one hundred grams of water which provided a 0.5 M solution of cuprous thiocyanate and a 6 M solution of ammonium thiocyanate. A sufficient amount of the solution was added to the redispersed gelatino-silver chlorobromide emulsion of Example I without the cuprous thiocyanate addition of that example to provide a silver bromide/cuprous thiocyanate molar ratio of 60/1 and 20 mole percent of thiocyanate based on the silver bromide. The resulting emulsion, after the addition of the usual hardeners and coating aids, was coated on a paper support to give a dry coating weight equivalent to 33 mg. of silver bromide per square decimeter. The coated emulsion was dried in a conventional manner.

Samples of the coated material were tested by the procedures described in Example I and gave the following results:

Light-dev.:
  Writing speed—26,000 in./sec.
  21-step $\sqrt{2}$ wedge—Image appeared in 10 sec. and 19 steps were visible after 3 minutes.
Chemical dev.:
  21-step $\sqrt{2}$ wedge—15 steps image was obtained having a $D_{max}$ of 1.0 and a fog of 0.00.

EXAMPLE III

To the redispersed silver chlorobromide emulsion not containing the cuprous thiocyanate addition of Example I there was added, per 1.5 moles of silver halide, the following:

Ml.
3 M ammonium thiocyanate _____ 40
0.1 M sodium bisulfite _____ 500
0.1 M cupric nitrate _____ 125

The mixture was stirred for 5 minutes at 95° F. This procedure yielded a silver halide/cuprous thiocyanate ratio of 120/1, or 0.8 mole percent cuprous thiocyanate with 8 mole percent thiocyanate present. The resulting emulsion was prepared and coated as described in the previous examples to give a dry coating weight equivalent to 37 mg. of silver bromide per square decimeter. The coated emulsion was dried in a conventional manner.

Samples of the coated material were tested as described in Example I and gave the following results:

Light-dev.:
  Writing speed—30,000 in./sec.
  21-step $\sqrt{2}$ wedge—Image appeared in 5 seconds and 19 steps were visible after 3 minutes.
Chemical dev.:
  21-step $\sqrt{2}$ wedge—13-step image against a fog-free background with $D_{max}$ of 1.0.

EXAMPLE IV

The redispersed silver chlorobromide emulsion not containing a cuprous thiocyanate addition emulsion made as described in Example I was sensitized by digesting with gold and sulfur sensitizers for 30 minutes at 135° F. The procedure of incorporating cuprous thiocyanate as described in Example III was then repeated and the emulsion coated to give a dry coating weight equivalent to 33 mg. of silver bromide per square decimeter. When tested as described above, the following results were obtained:

Light dev.:
  Writing speed—37,500 in./sec.
  21-step $\sqrt{2}$ wedge—Image appears in 7 seconds and 17 steps were visible after 3 minutes.
Chemical dev.:
  Writing speed—60,000 in./sec.
  21-step $\sqrt{2}$ wedge—19-step image against a fog-free background with a $D_{max}$ of 1.0.

EXAMPLE V

The redispersed silver chlorobromide emulsion not containing the cuprous thiocyanate addition of Example I was optically sensitized by digesting with an ortho sensitizing dye for 30 minutes at 119° F. Cuprous thiocyanate was incorporated as described in Example III and the emulsion coated to give a dry coating weight equivalent to 40 mg. silver bromide per square decimeter. Samples of the coated material were exposed with and without a Wratten No. 8 filter with the following results:

Light Development

| | No Filter | Wratten #8 Filter |
|---|---|---|
| 21-step $\sqrt{2}$ wedge | 20 steps became visible. | 17 steps became visible. |

Chemical Development

| | | |
|---|---|---|
| 21-step $\sqrt{2}$ wedge | 18 steps became visible. | 15 steps became visible. |

EXAMPLE VI

The following solutions were prepared:
Solution A, 125° F.:

| Water (g.) | 1200 |
|---|---|
| Potassium chloride (g.) | 336.0 |
| Potassium bromide (g.) | 35.2 |
| Gelatin (g.) | 40.0 |

Solution B, 95° F.:

| 3 M silver nitrate (ml.) | 500 |
|---|---|
| Water (g). | 2200 |

Solution B was added to Solution A in 500 seconds; the resulting emulsion was ripened at 120° F. for 25 seconds, then cooled to 80° F. The resulting 80/20 chloride/bromide ratio silver chlorobromide emulsion was coagulated, washed and redispersed by the technique described in Moede, U.S. Patent 2,772,165.

The the redispersed emulsion the following materials were added to yield the following concentrations based on silver halide.

| | Mole, percent |
|---|---|
| 0.5 M plumbous nitrate solution | 2 |
| 3 M potassium bromide solution | 60 |
| Cuprous thiocyanate emulsion (Example I) | 33⅓ |
| 3 M Ammonium thiocyanate solution | 20 |

The resulting emulsion, after the addition of the usual hardeners and coating aids, was coated on a paper support to give a dry coating weight equivalent to 40 mg. of silver bromide per square decimeter. The coated emulsion was dried in a conventional manner.

Samples of the coatings were tested in the manner described in Example I and gave the following results:

Light dev.:
21-step $\sqrt{2}$ wedge—Image appears in 17 seconds, 15 steps were visible after 3 minutes.

Chemical dev.:
21-step $\sqrt{2}$ wedge—16-step image against a fog-free background with a $D_{max}$ of 1.0.

EXAMPLE VII

The following solutions were prepared:

Solution A, 125° F.:

| Water (g.) | 1200 |
|---|---|
| Potassium chloride (g.) | 336 |
| Gelatin (g.) | 40 |

Solution B, 95° F.:

| 3 M silver nitrate solution (ml.) | 500 |
|---|---|
| Water (g.) | 2200 |

Solution B was added to Solution A in 500 seconds, the emulsion was ripened at 120° F. for 25 seconds, then cooled to 80° F. The resulting silver chloride emulsion was coagulated, washed and redispersed as described above. To the redispersed emulsion there were added the following materials to yield the following concentrations:

| | Mole, percent |
|---|---|
| 0.5 M plumbous nitrate solution | 2 |
| 3 M potassium bromide solution | 60 |
| Cuprous thiocyanate emulsion (Examplie I) | 33⅓ |
| 3 M Ammonium thiocyanate solution | 20 |

The resulting emulsion, after the addition of the usual hardeners and coating aids, was coated on a paper support and dried.

When tested as described above the following results were obtained:

Light dev.:
21-step $\sqrt{2}$ wedge—Image appears in 20 seconds, 16 steps visible after 3 minutes.

Chemical dev.:
21-step $\sqrt{2}$ wedge—19 steps against a fog-free background with a $D_{amx}$ of 1.0.

EXAMPLE VIII

The procedure of Example VI was repeated except the following solutions were prepared:
Solution A, 125° F.:

| Water (g.) | 1200 |
|---|---|
| Potassium chloride (g.) | 336 |
| Potassium bromide (g.) | 88 |
| Gelatin (g.) | 40 |

Solution B, 95° F.:

| 3 M silver nitrate solution (ml.) | 500 |
|---|---|
| Water (g.) | 2200 |

Solution B was added to Solution A in 500 seconds; the emulsion was ripened at 120° F. for 25 seconds, then cooled to 80° F. The halide ratio of the resulting silver chlorobromide emulsion was 50/50 chloride/bromide. After coating and drying, samples were tested as described above with the following results:

Light dev.:
21-step $\sqrt{2}$ wedge—Image appears in 20 seconds, 12 steps visible after 3 minutes.

Wet dev.:
21-step $\sqrt{2}$ wedge—13-step image against a fog-free background, with a $D_{max}$ of 1.0.

The above described direct-writing elements of this invention have many advantages over the elements of the prior art. The direct writing elements of this invention have high writing speeds and low image access times. They also provide images having high densities, low fog or background density and in addition they provide images and background having greater stability against fading and growth respectively. An outstanding advantage is that the invention provides direct writing elements which can be either light developed or chemically developed to give essentially equivalent results in sensitometric characteristics. Chemical development can also be carried out using conventional commercially available developers. Another advantage is that the speed under wet development can be easily varied by chemical sensitization.

Where desired, other halides or combinations of halides may be used to form the silver halide grains. For example, pure silver chloride or pure chlorobromide may be used. Where soluble chloride salts are used it is desirable because of solubility differences, to form the silver halide grains of desired composition and size and then add sufficient soluble bromide salts to provide the desired concentration of bromide ions.

In place of the gelatin binding agent used in the foregoing examples, there can be substituted other natural or synthetic wafer permeable organic colloid binding agents, including the binding agents listed in U.S. Patent 3,033,682.

Suitable supports for the novel photographic emulsions of this invention include those used in prior art oscillograph recording elements. The preferred support is paper but may be a hydrophobic film, e.g., cellulose acetate or the polyesters described in Alles et al. U.S. Patents 2,627,088 and 2,779,684.

The embodiments of the invention in which an exclusive property or privilege is claimed are defined as follows:

1. A light-developable, direct-writing, silver halide emulsion layer comprising radiation-sensitive silver halide grains having an average grain size in the range 0.1–10 microns dispersed in a water-permeable, macromolecular organic colloid having protective colloid properties, said layer containing, based on the silver halide:
  (a) 0.1 to 300 mole percent of cuprous thiocyanate,
  (b) 0.1 to 120 mole percent of a water-soluble thiocyanate salt,
  (c) 0 to 120 mole percent of a water-soluble bromide selected from the group consisting of Li, Na, K, Ca, Mg, and $NH_4$ bromide, and
  (d) 0 to 5 mole percent of a water-soluble plumbous salt.

2. An emulsion layer according to claim 1 wherein the silver halide is silver chlorobromide.

3. An emulsion layer according to claim 1 wherein said colloid is gelatin.

4. An emulsion layer according to claim 1 on a flexible paper support.

5. An emulsion layer according to claim 1 wherein the water-soluble thiocyanate salt is an alkali metal thiocyanate.

6. An emulsion layer according to claim 1 wherein the water-soluble thiocyanate salt is ammonium thiocyanate.

References Cited

UNITED STATES PATENTS

| 3,241,971 | 3/1966 | Kitze | 96—107 |
| 3,033,682 | 5/1962 | Hunt | 96—108 |

FOREIGN PATENTS

| 724,001 | 2/1955 | Great Britain. |

RONALD H. SMITH, Primary Examiner

U.S. Cl. X.R.

96—109, 108, 107